United States Patent Office 3,145,691
Patented Aug. 25, 1964

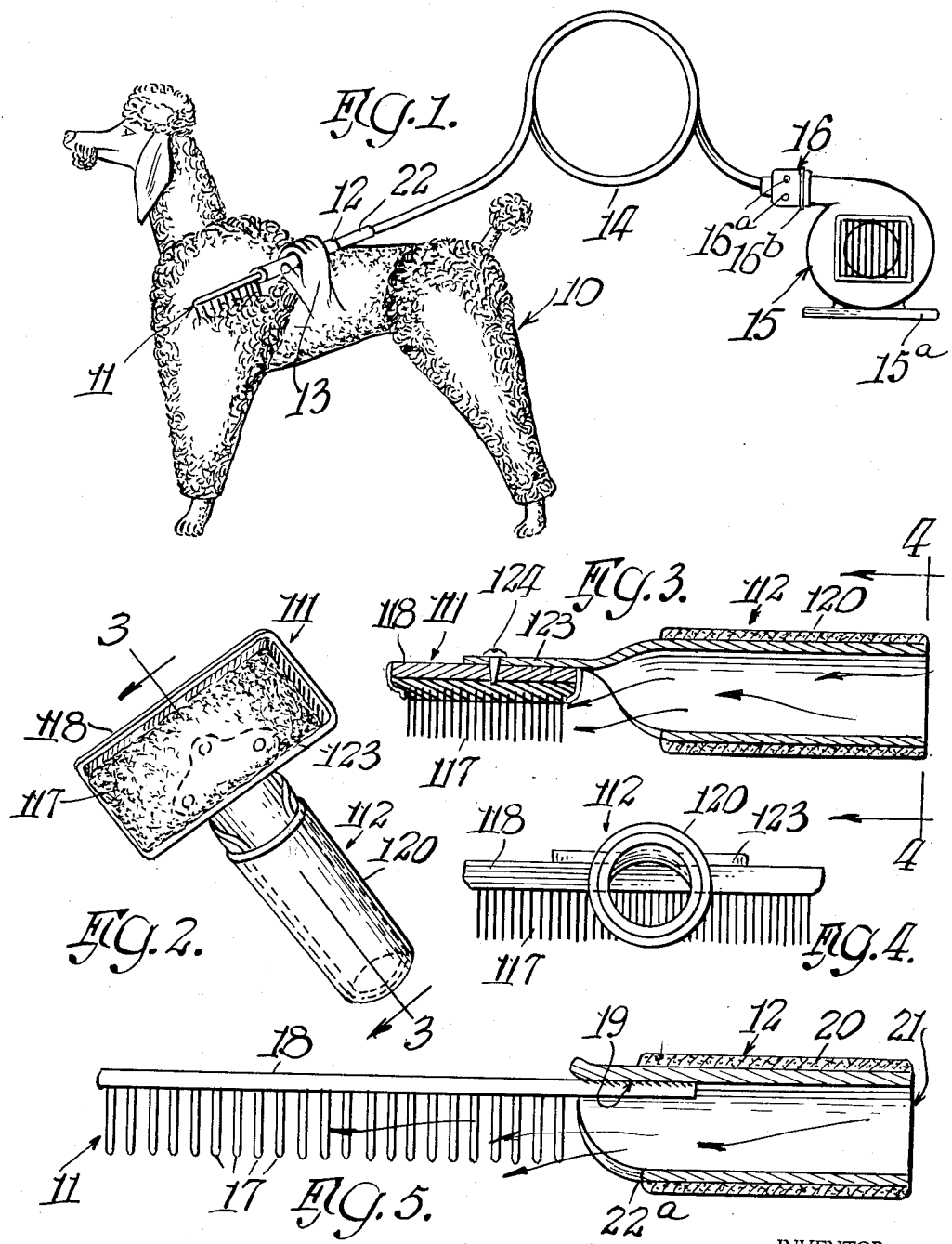

3,145,691
GROOMING APPARATUS
Charles Howard Yates, 902 S. Austin Blvd., Oak Park, Ill.
Filed Sept. 9, 1963, Ser. No. 307,696
1 Claim. (Cl. 119—83)

This invention relates to an apparatus for dog care and, more particularly, to an apparatus useful in grooming dogs.

The invention finds particular utility in connection with the grooming of poodles. Therefore, the disclosure is articulated in terms of that dog, although it will be immediately appreciated that the invention has utility in connection with a wide variety of dogs.

It has been widely recognized that grooming is difficult for long-haired dogs, more especially so with poodles, so that many dog owners are reluctant to undertake grooming. Even in the case of people who specialize in dog grooming, the affair is expensive and costly to the dog owner. With the increased popularity of dog ownership, veterinarians and the people operating dog hospitals and kennels experience difficulty in finding the time to suitably groom the dog just prior to return to the owner.

It is, therefore, an object of the invention to provide a means for grooming dogs, particularly long-haired dogs such as poodles, which is achievable in a shorter period of time and achieves a thorough grooming job even in less than expert hands.

Another object of the invention is to provide a novel apparatus for dog care wherein a grooming tool or implement is operationally associated with means for drying the dog simultaneously.

Still another object of the invention is to provide a means of dog care wherein a number of dog grooming tools are selectively associated with drying equipment for the purpose of undertaking a complete program of dog grooming in a relatively short time.

Other objects and advantages of the invention may be seen in the details of operation and construction set down in this specification.

The invention is described in conjunction with the accompanying drawing, in which—

FIG. 1 is an elevational view showing a poodle being groomed according to the teachings of the invention;

FIG. 2 is a fragmentary perspective view of a grooming tool employed in the practice of the invention;

FIG. 3 is a longitudinal sectional view of the device of FIG. 2 such as would be seen along the sight line 3—3 as applied to FIG. 2;

FIG. 4 is an end elevational view of the device of FIGS. 2 and 3 as would be seen along the sight line 4—4 applied to FIG. 3; and FIG. 5 is a fragmentary elevational view, partially in section, showing a modified form of implement employed in the practice of the invention.

In the illustration given and with reference to FIG. 1, the numeral 10 designates generally a poodle which is seen to have a Royal Dutch Clip. It will be appreciated that a variety of other clips may be utilized, but in any event there is a substantial quantity of hair that requires grooming. In the showing in FIG. 1, the grooming operation is illustrated using a comb 11 equipped with a handle portion 12 held in the hand 13 of a groomer (not shown). Attached to one end of the handle 12 is a length of hose 14 which is connected to a dryer 15. A wide variety of commerical dryers such as hair dryers are employable in the practice of the invention. The dryer 15 delivers a stream of heated air to the hose 14 which is coupled thereto by means of an adapter 16, whereupon air flows through the handle 12 in a course defined by the arrows shown in FIGS. 3 and 5 for application at the point of brushing, combing, etc.

In the illustration given, particularly FIG. 5, the comb 11 is seen to be equipped with the usual depending metal teeth 17 which issue from a mounting plate 18. The mounting plate 18 is suitably secured as by welding as at 19 to the interior of the handle 12, which is generally tubular-shaped. The handle 12 advantageously may be equipped with an insulating layer 20 to prevent burning the hand of the person performing the grooming. The end 21 (see FIG. 5) of the handle 12 serves as a socket for the receipt of the hollow plug 22 provided at the end of the hose 14. The discharge end 22 of the handle 12 is cut away as at 22a so as to release the air partially downwardly and thus eliminates localized concentrations of heated air which might make the dog 10 uncomfortable.

Prior to the use of the comb 11, the device seen in FIGS. 2–4 is advantageously applied, which includes a handle 112 again equipped with insulation as at 120, the implement itself including a brush 111 having depending bristles as at 117. In the illustration given in FIGS. 2–4, the upper side of the handle 112 is extended as at 123 and provides a mounting plate securable to the back 118 of the brush 111—as by wood screws or rivets 124.

In the operation of the device, after the adapter 116 is attached to the dryer 15, the dryer is permitted to run for a few minutes with an attachment such as 11, 111, etc. connected to the hose. If the attachment becomes too warm for proper handling, holes 16a may be cut into the flexible plastic adapter or, if such holes are previously provided, the same may be exposed by adjusting the securing band as at 16b. Once, however, the adapter has been so adjusted, it should be adequate for future operations, assuming the temperature to be normal temperatures encountered when dogs are being bathed an dried.

After bathing 10 and removing all surplus water as by toweling, the brush attachment 111 is employed in a manner similar to the use of a comb. The initial brushing is performed with a brush having relatively coarse bristles and is manipulated both by brushing with the lay of the hair and against the lay, so as to get the heat from the dryer circulating thoroughly through the hair. When doing the ears and the tail, these elements are grasped by the end of each and the attachment used in a sidewise motion upwardly, then following with the lay of the hair. The coarse brush attachment should be used until the coat is quite dry, making sure to get under the body and legs during the process. On occasion, it is useful, especially in the case of heavy coats, to follow with the use of a finer bristled brush, i.e., where the bristles are much more closely centered. Such an attachment may be used to accomplish a finished effect on the grooming and produce a very pleasing groomed effect. Again, the brush attachment is employed on the ears and tail by brushing upwardly in a sidewise motion, thereafter following with the lay of the hair.

A variety of wire brushes are available for different grooming spots. Each such utensil or implement is advantageously mounted in the fashion illustrated in FIGS. 2–4, utilizing the hollow handle of the hose as a manipulating handle for the brush.

The comb 11 illustrated in FIGS. 1 and 5 is employed by movement with the lay of the hair first and, if slightly undried spots are encountered, the comb is placed in the hair and pulled outwardly, so as to dry thoroughly, after which the comb is moved upwardly against the lay of the hair. The comb attachment is especially advantageous for use on the top of the head, particularly near the eyes.

The invention also finds utility in connection with grooming operations other than those immediately following bathing, since the flow of air is helpful in removing many tangles. Following clipping, the flow of air is effective for loosening adherent pieces of hair.

I find that through the use of the grooming method and attachments described herein, a dog now may be dried and groomed in a short period of time, usually less than one-half the time required by ordinary methods, so as to make possible the grooming of many more dogs in the same time by grooming parlors, handlers at dog shows, kennels, individual dog owners and veterinarians.

Desirably, the dryer 15 may be equipped with a base 15a suitable for securement to a table or other work surface. This, in connection with the elongated flexible hose 14, makes the job of grooming relatively easy. One of the attractive and outstanding features of the attachment is the ease of handling the various attachments. One hand is all that is necessary for manipulating the attachments, leaving one hand free for handling the dog during the grooming and drying process.

While in the foregoing specification a detailed description of the invention has been set down for the purpose of explanation thereof, many variations in the details herein given may be made by those skilled in the art without departing from the spirit and scope of the invention.

I claim:

Apparatus for simultaneously grooming and drying the hair of a poodle, or the like, comprising a dryer adapted to deliver heated air under pressure, a flexible hose coupled at one end thereof to said dryer and providing a heated air outlet at the other end, a brush mounted on said hose other end, said brush including a rigid, plate-like back having a plurality of generally parallel rows of elongated bristles depending therefrom, an insulated tubular handle securing said back with said hose other end, said handle having a flat, projecting portion secured to said back and a generally circular air discharge opening disposed substantially below said back and in confronting relation with an adjacent portion of said rows of bristles whereby air issuing from said opening flows generally transversely to the length of said bristles and to said adjacent portion, said back when said brush is moved in a generally reciprocatory fashion in grooming a dog confining said air in and about said bristles.

References Cited in the file of this patent
UNITED STATES PATENTS

| | | |
|---|---|---|
| 718,054 | Head | Jan. 6, 1903 |
| 847,872 | Allen et al. | Mar. 19, 1907 |

FOREIGN PATENTS

| | | |
|---|---|---|
| 617,436 | Canada | Mar. 28, 1961 |